(No Model.)
G. S. SHEFFIELD.
HAND CAR.
No. 260,903. Patented July 11, 1882.
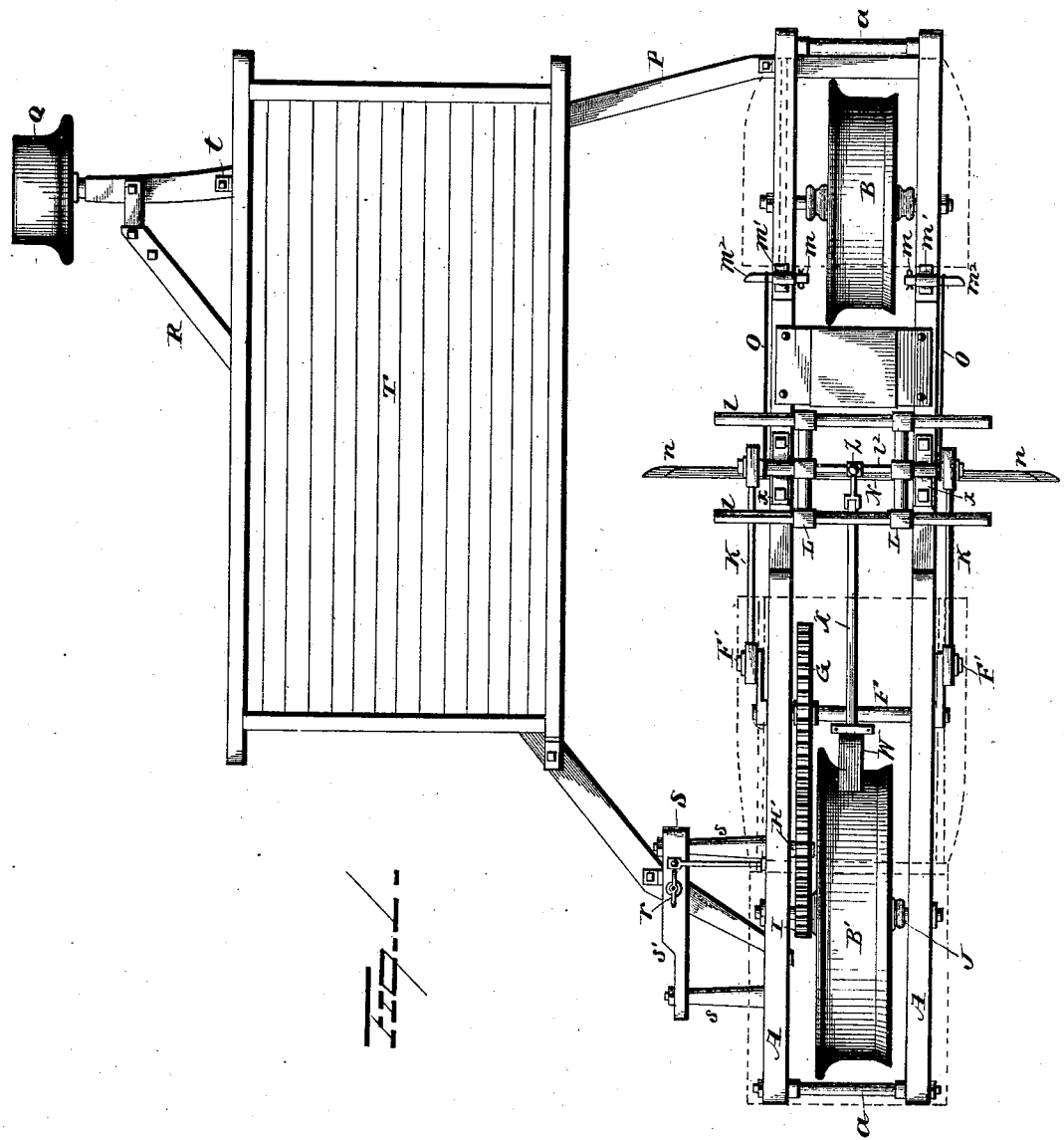
WITNESSES
INVENTOR

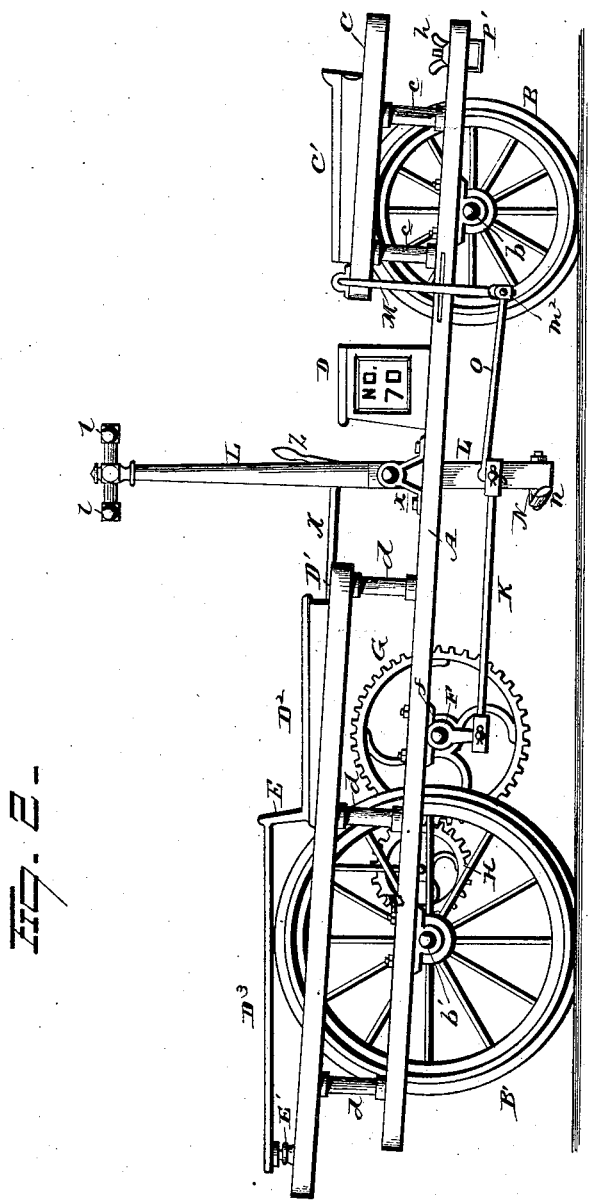

(No Model.) 3 Sheets—Sheet 3.
G. S. SHEFFIELD.
HAND CAR.
No. 260,903. Patented July 11, 1882.
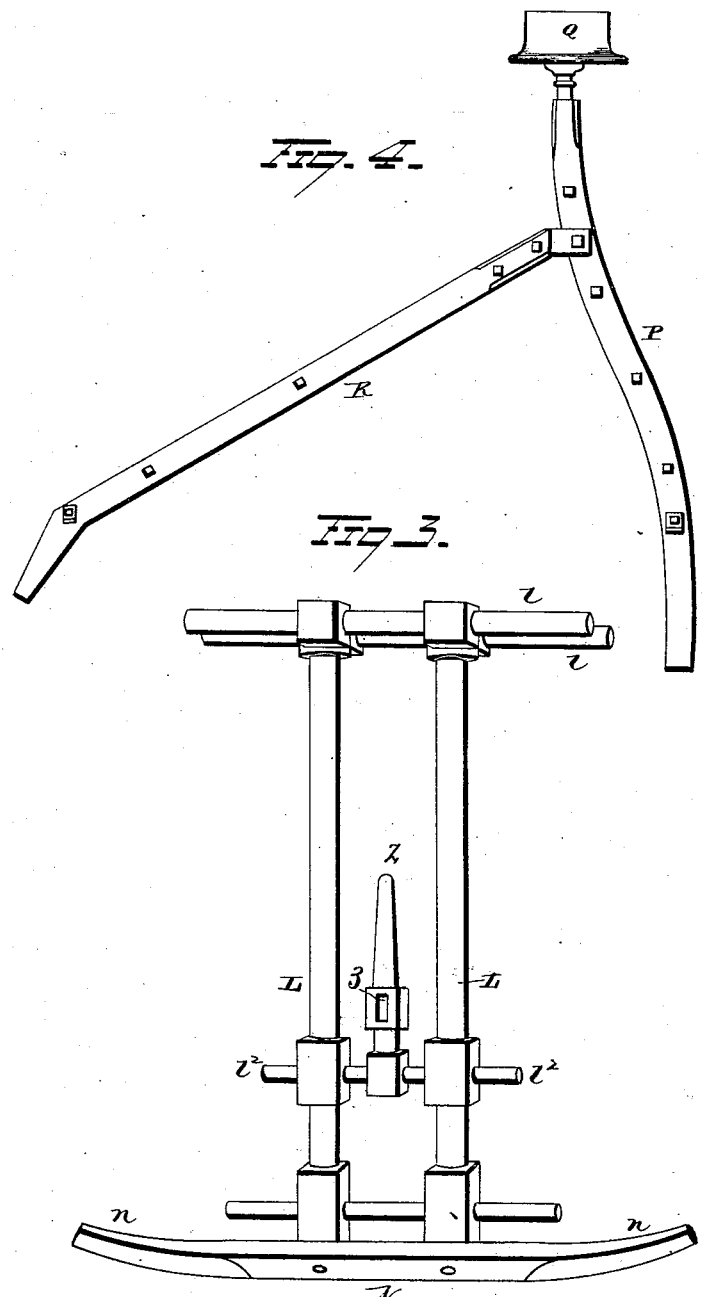
WITNESSES
INVENTOR

UNITED STATES PATENT OFFICE.

GEORGE S. SHEFFIELD, OF THREE RIVERS, MICHIGAN, ASSIGNOR OF ONE-HALF TO WARREN J. WILLITS, OF SAME PLACE.

HAND-CAR.

SPECIFICATION forming part of Letters Patent No. 260,903, dated July 11, 1882.

Application filed March 1, 1882. (No model.)

*To all whom it may concern:*

Be it known that I, GEORGE S. SHEFFIELD, of Three Rivers, in the county of St. Joseph and State of Michigan, have invented certain new and useful Improvements in Hand-Cars; and I do hereby declare the following to be a full, clear, and exact description of the invention, such as will enable others skilled in the art to which it pertains to make and use the same.

My invention relates to hand-cars or railway-velocipedes, the object being to provide a car capable of carrying two or more persons, and so constructed and arranged that the propelling-lever will be between the riders and adapted to be operated jointly by them; and, further, to provide a hand-car with propelling devices of improved construction, whereby the labor of the propulsion will be lessened and a steady movement of the operating-lever insured.

A further object of the invention is to provide the car with improved devices for supporting a tool-box or like receptacle.

With these ends in view the invention consists in the combination, with the operating-lever and the propelling mechanism of the car, of a foot rest or rests secured to the lever.

The invention further consists in the combination, with the car-truck, of a lateral arm adapted to support the small guide-wheel of the car and an adjustable brace connected with said arm and car, and adapted, in connection with said arm, to support a tool-box or similar receptacle.

The invention further consists in the combinations of parts hereinafter set forth, and pointed out in the claims.

In the drawings, Figure 1 is a plan view of a car embodying my improvements. Fig. 2 is a side elevation of the same, the lateral arm and its brace being removed. Fig. 3 is a detached view of the operating-lever and brake-lever. Fig. 4 is a similar view of the lateral arm, with its brace.

The frame or truck of the car consists of two parallel longitudinal bars, A A, connected at or near each end by a transverse brace, $a$.

Between the bars A A, near their forward ends, is a riding-wheel, B, journaled in bearings $b$ on the under side of the bars.

Near the opposite end of the truck a driving-wheel, B', is similarly journaled, beneath the bars A A, in bearings $b'$.

C represents a seat-frame arranged immediately over the riding-wheel B, and supported upon the truck by vertical standards $c$, and provided with a seat, $c'$. Immediately in rear of this frame a box, D, may be secured to the truck.

A rear seat-frame, D', is supported upon the truck by vertical standards $d$, and provided with a seat, $D^2$, and a rear platform or seat, $D^3$, the latter being slightly elevated above the seat $D^2$, and supported at its forward end upon the back $e$ of said seat, and at its rear end upon short standards $e'$ of the seat-frame.

F represents a crank-shaft mounted in bearings $f$ on the under side of the truck and beneath the rear seat, $D^2$. This shaft carries a cog-wheel, G, gearing with a smaller cog-wheel, H, mounted on an inwardly-projecting stud, H', of the truck, and with a pinion, I, rigidly mounted on the shaft J of the driving-wheel B'.

The tread of the wheels B and B' is made slightly concave in cross-section to better adapt them to the rails and prevent accidental displacement.

On each end of the crank-shaft F is provided a crank-pin, F', to which is secured a pitman, K, connecting with the lower end of the operating lever L. The latter is supported in bearings $x$ $x$ of the truck, and consists of two parallel vertical rods or standards connected at their upper ends by horizontal parallel cross-bars $l$ $l$, secured, one on either side of the standards, in any suitable manner to constitute handles for the lever, and by a cross-brace, $l^2$, whose ends receive the forward end of the pitman. The lower ends of the lever-standards are secured to a transverse brace, N, whose laterally-projecting ends $n$ are slightly curved to form foot-rests for the operators of the car, as will be hereinafter further explained.

M M represent pendent rods, having inwardly-bent upper ends, $m$, adapted to be pivotally secured in bearings $m'$ $m'$ on either side of the seat-frame C. To the lower ends of these rods are secured, by pivots $m^2$, links or pitmen O, adapted to be secured at their rear ends to the ends of the cross-brace $l^2$ of the lever, to act in conjunction with said lever and the crank-shaft.

Z represents a brake-lever supported between the standards of the operating-lever by the transverse rod $l^2$. Within a socket, $z$, of this lever is secured the forward end of a brake-bar, X, which extends rearwardly and is supported in suitable guides beneath the seat $D^2$, and is provided at its rear end with a brake-shoe, W, adapted to be forced against the driving-wheel B' when the brake-lever Z is pulled backward.

P represents a laterally-projecting arm adapted to be secured adjustably by thumb-screws $p$ at its inner end in bearings P' P', arranged on the under side of the forward end of the truck. A guide-wheel, Q, is mounted on the outer end of the arm P to travel on the opposite rail to that on which the riding and driving wheels travel.

R represents a diagonal brace secured adjustably at one end to the lateral arm P, while its opposite end is adjustably secured by a thumb-screw, $r$, to a frame, S, the latter consisting of two arms, $s\ s$, projecting laterally from the inner side of the rear end of the truck and supporting a bar, $s'$, arranged parallel with the bars of the truck and secured to the outer ends of the arms $s\ s$.

T represents a tool-box secured by brackets $t$ upon the arm P of the car and adapted to be supported at its opposite end upon the diagonal brace R.

The car as thus constructed may be used on either broad or narrow gage roads by adjusting the lateral arm.

The combination of the foot-rests with the operating-lever enables the latter to be manipulated both by the hands and feet of the operators, and thus multiply the propelling power.

It will be apparent that many changes and modifications in the construction and relative arrangements of many parts of my device may be made without departing from the spirit of my invention; and hence I would have it understood that I do not limit myself to the exact construction shown and described, but reserve to myself the right to make such alterations and changes in form and construction as may properly fall within the spirit and scope of my invention.

Having fully described my invention, what I claim as new, and desire to secure by Letters Patent, is—

1. In a hand-car or railway-velocipede, the combination, with the driving-wheel and gearing for propelling the car, of an operating-lever provided with two parallel handles at its upper end, and with laterally-projecting foot-rests secured to its lower end, substantially as and for the purpose set forth.

2. In a hand-car or railway-velocipede, the combination, with the operating-lever, of a brake-lever secured thereto and provided with a brake rod and shoe, substantially as set forth.

3. In a hand-car or railway-velocipede, the combination, with the truck, of a laterally-projecting arm adjustably secured in bearings on the truck and carrying a guide-wheel, a diagonal brace secured to said arm and to the truck, and a tool-box or other receptacle adapted to be supported upon said arm and brace, substantially as set forth.

4. In a hand-car or railway-velocipede, the combination, with the truck and a laterally-projecting arm secured at one end to the truck and carrying a guide-wheel at its opposite end, of a diagonal brace secured at one end to said arm and at its opposite end to a frame projecting laterally from the truck, and a tool-box or other receptacle adapted to be supported upon said arm and brace, substantially as set forth.

5. In a hand-car or railway-velocipede, the combination, with the truck, of a crank-shaft and suitable gear, a lever provided with double handles, pitmen arranged on either side of said lever, and pendent arms pivoted to the forward end of the car and connected by pitmen to the operating-lever, substantially as set forth.

6. In a hand-car, the combination, with an operating-lever provided with two parallel handles at its upper end and with foot-rests at its lower end, of two seats arranged on opposite sides of the operating-lever and in close proximity thereto, substantially as and for the purpose set forth.

7. In a railway hand-truck or velocipede, the combination, with the main frame, of a laterally-projecting frame projecting inwardly from said main frame for the support of the diagonal brace to the lateral arm.

In testimony whereof I have signed this specification in the presence of two subscribing witnesses.

GEORGE S. SHEFFIELD.

Witnesses:
S. A. GREENWOOD,
A. C. TITUS.